United States Patent
Grunnet-Jepsen et al.

(10) Patent No.: US 10,007,994 B2
(45) Date of Patent: Jun. 26, 2018

(54) STEREODEPTH CAMERA USING VCSEL PROJECTOR WITH CONTROLLED PROJECTION LENS

(71) Applicant: Intel Corporation, Santa Clara, CA (US)

(72) Inventors: Anders Grunnet-Jepsen, San Jose, CA (US); Leonid M. Keselman, Santa Clara, CA (US); Krishna Swaminathan, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 127 days.

(21) Appl. No.: 14/998,267

(22) Filed: Dec. 26, 2015

(65) Prior Publication Data

US 2017/0186167 A1 Jun. 29, 2017

(51) Int. Cl.
  *G06T 7/00* (2017.01)
  *H04N 13/02* (2006.01)
  *H04N 13/00* (2018.01)

(52) U.S. Cl.
  CPC ....... *G06T 7/0057* (2013.01); *H04N 13/0022* (2013.01); *H04N 13/025* (2013.01); *H04N 13/0239* (2013.01); *H04N 2013/0081* (2013.01)

(58) Field of Classification Search
  CPC .............. G06T 7/0057; H04N 13/0242; H04N 13/025; H04N 13/0022
  See application file for complete search history.

(56) References Cited

U.S. PATENT DOCUMENTS

| | | |
|---|---|---|
| 2002/0043561 A1 | 4/2002 | Tsikos et al. |
| 2010/0128221 A1 | 5/2010 | Muller et al. |
| 2012/0056982 A1 | 3/2012 | Katz et al. |
| 2014/0240464 A1 | 8/2014 | Lee |
| 2015/0097947 A1 | 4/2015 | Hudman et al. |

OTHER PUBLICATIONS

International Search Report & Written Opinion for Application No. PCT/US2016/060155, dated Feb. 20, 2017, 20 pages.

*Primary Examiner* — Huy T Nguyen
(74) *Attorney, Agent, or Firm* — Womble Bond Dickinson (US) LLP

(57) ABSTRACT

In accordance with disclosed embodiments, there are provided systems, methods, and apparatuses for implementing a stereodepth camera using a VCSEL projector with a controlled projection lens. For instance, a depth camera is described having therein a Vertical-Cavity Surface-Emitting Laser projector (VCSEL projector) to emit a plurality of infrared beams; a moveable lens to control the focus of the plurality of infrared beams emitted from the VCSEL projector, in which the plurality of infrared beams are projected through the moveable lens to form a projected pattern projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector. Other related embodiments are disclosed.

25 Claims, 12 Drawing Sheets ered in connection with the figures in which:
STEREODEPTH CAMERA USING VCSEL PROJECTOR WITH CONTROLLED PROJECTION LENS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of image capture devices such as cameras, and more particularly, to systems, methods, and apparatuses for implementing a stereodepth camera using a VCSEL (Vertical-Cavity Surface-Emitting Laser) projector with a controlled projection lens.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional cameras capture a single image from a single optical focal point and are enabled to capture pixels corresponding to an object in a scene, but in so doing, such cameras lose the depth information for where within the scene that object is positioned in terms of depth or distance from the camera.

Conversely, stereo cameras have two or more lenses, either on the same or separate image sensors, and the two or more lenses allow the camera to capture three-dimensional images through a process known as stereo photography. With such conventional stereo cameras, triangulation is used to determine the depth to an object in a scene using a process known as correspondence. Correspondence presents a problem, however, of ascertaining which parts of one image captured at a first of the lenses correspond to parts of another image, captured at a second of the lenses. That is to say, which elements of the two photos correspond to one another as they represent the same portion of an object in the scene, such that triangulation may be performed to determine the depth to that object in the scene.

Given two or more images of the same three-dimensional scene, taken from different points of view via the two or more lenses of the stereo camera, correspondence processing requires identifying a set of points in one image which can be correspondingly identified as the same points in another image by matching points or features in one image with the corresponding points or features in another image.

Other three-dimensional (3D) processing methodologies exist besides correspondence based triangulation, such as laser time of flight and projection of coded light.

Certain 3D imaging and depth sensing systems have incorporated a laser projector to improve correspondence processing, however, the conventional solutions applied to 3D imaging and depth sensing systems suffer from a variety of drawbacks.

The present state of the art may therefore benefit from the systems, methods, and apparatuses for implementing a stereodepth camera using a VCSEL projector with a controlled projection lens as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1A:
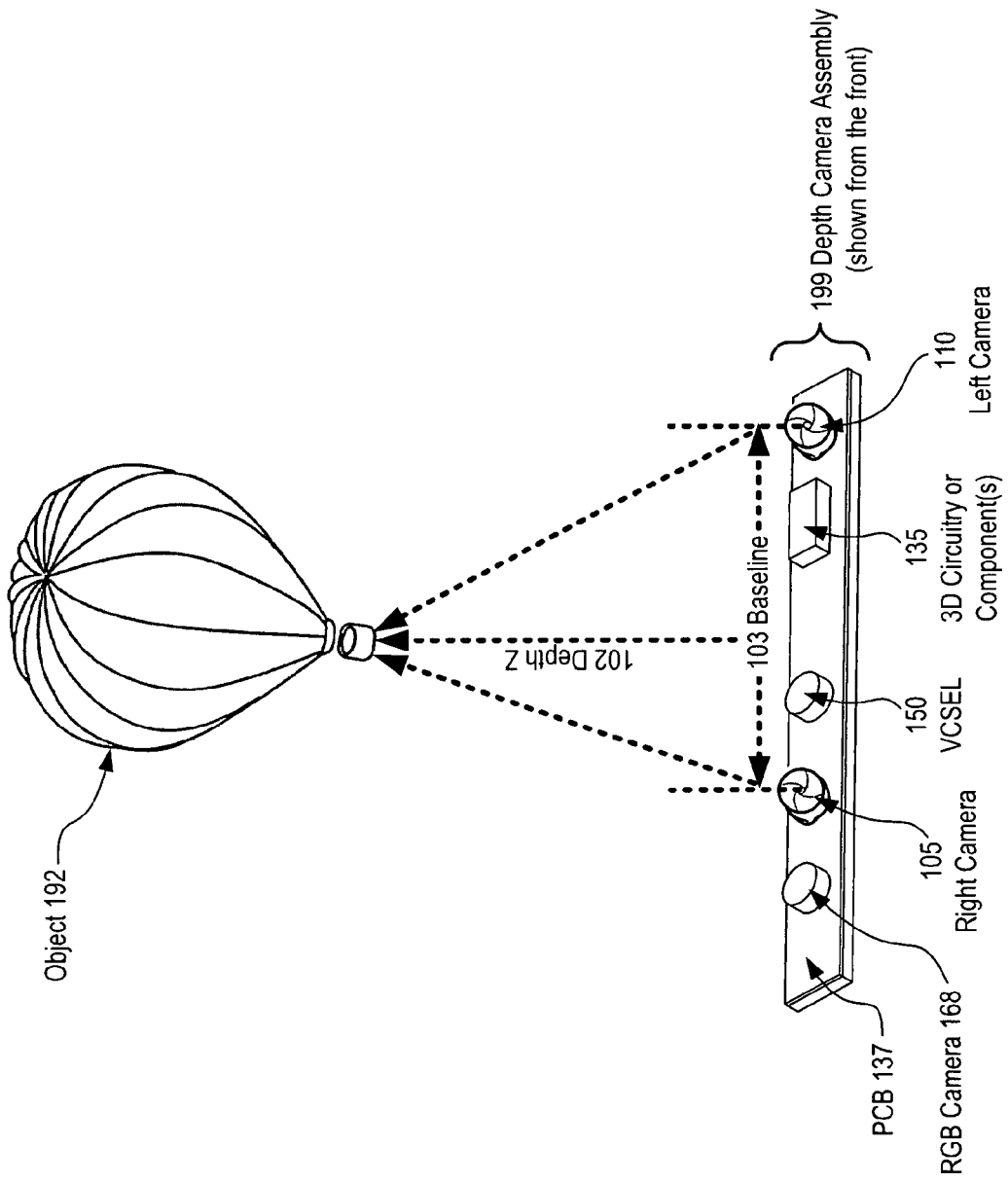
FIG. 1A illustrates an exemplary architecture in accordance with which embodiments may operate.

Described herein are systems, apparatuses, and methods for implementing a stereodepth camera using a VCSEL projector with a controlled projection lens. For instance, a depth camera is described having therein a Vertical-Cavity Surface-Emitting Laser projector (VCSEL projector) to emit a plurality of infrared beams; a moveable lens to control the focus of the plurality of infrared beams emitted from the VCSEL projector, in which the plurality of infrared beams are projected through the moveable lens to form a projected pattern projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary architecture in accordance with which embodiments may operate. In particular, there is depicted a depth camera assembly 199 having a printed circuit board 137 upon where there are 3D circuitry or components 135, a VCSEL 150, an RGB camera 168, and a right camera 105 and left camera 110. The 3D circuitry or components 135 may include a processing component such as processing circuitry which may include, for instance, one or more CPUs, memory, busses, FPGAs, a triangulator, etc.

Note that the right camera 105 is depicted on the left hand side of the depth camera assembly 199 and the left camera 110 is depicted on the right hand side of the depth camera assembly 199 because when a camera is used to capture an image of the scene, the depth camera assembly 199 of the camera will be facing away from the user.

Using the right camera 105 and left camera 110 of the stereoscopic depth camera, two images are captured.

The right camera 105 and left camera 110 form a stereoscopic depth camera system, by which the two cameras are separated by a distance called the baseline 103, and are pointed in the same direction, as shown. The object 192 is at depth Z (element 102) as observed by the cameras.

The two cameras (right camera 105 and left camera 110) are a known and fixed distance from each other, establishing the baseline 103. Depending on the distance to the object 192 at depth Z (element 102) the object will shift by a different amount for each of two separate images taken by the right camera 105 and left camera 110 respectively.

This shift of the object in the scene is called disparity.

Figure 1B:
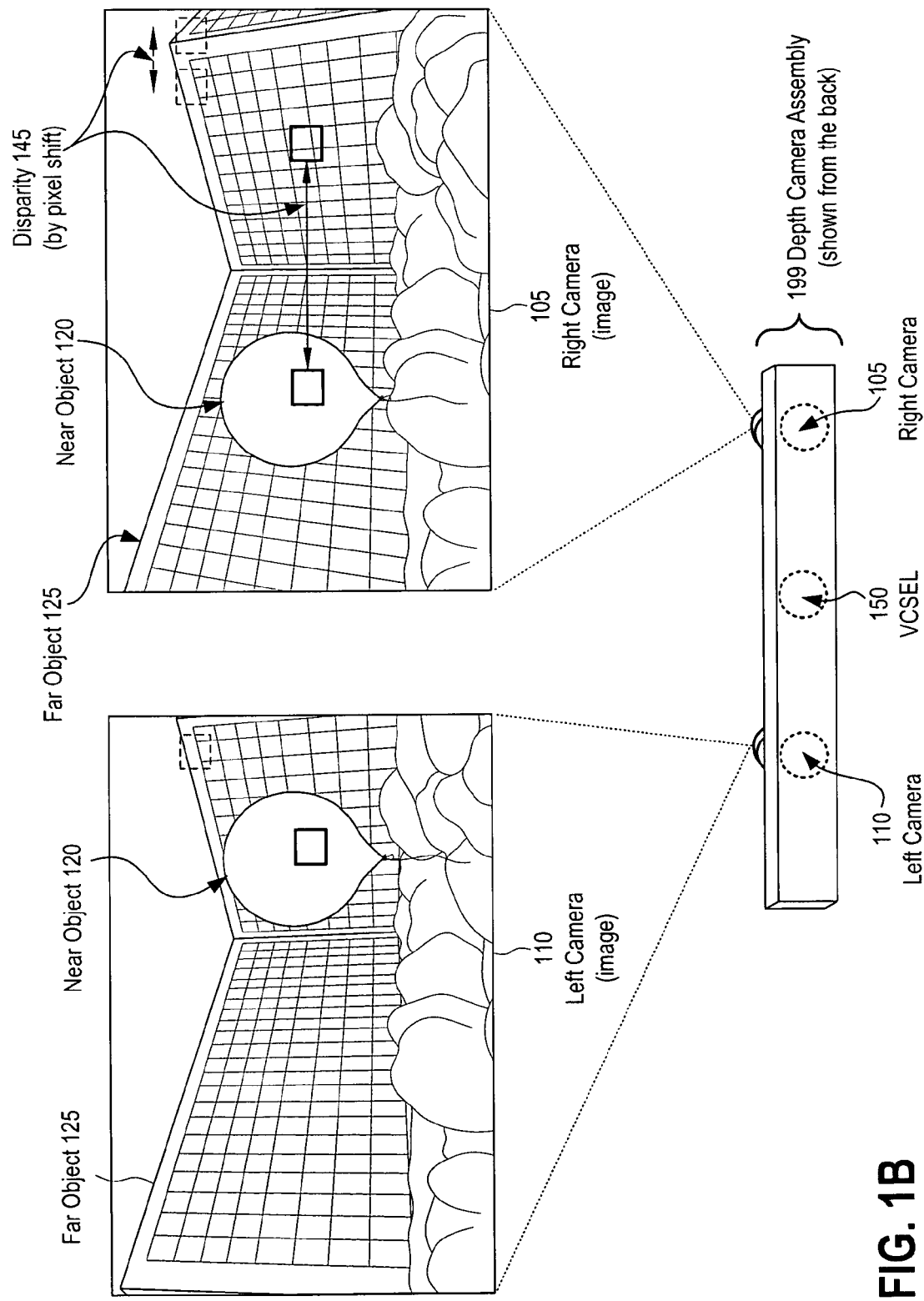
FIG. 1B illustrates another exemplary architecture in accordance with which embodiments may operate.

FIG. 1B illustrates another exemplary architecture in accordance with which embodiments may operate. In particular, there is depicted a far object 125 (e.g., the building in the background) having been captured within the image of the scene by each of the left camera 110 and the right camera 105. Also depicted is a near object 120 (e.g., the balloon) having been captured within the image of the scene by each of the left camera 110 and the right camera 105. Note that the depth camera assembly 199 has been rotated such that it is now facing the scene and the left camera 110 and left image is on the left hand side and the right camera 105 and the right image is on the right hand side.

The farther the object is within the images captured by the right camera 105 and left camera 110, the less the shift and the closer the object is within the images captured by the right camera 105 and left camera 110, the more the shift, thus permitting the depth sensing functionality of the depth camera assembly 199 to determine disparity 145 by pixel shift. The distance or depth to an object in the scene, near or far, therefore depends on how far apart the corresponding points are as established by the disparity 145 for the respective object.

A single image of a scene captured via a single camera will have no depth information whatsoever for an object because given an imaginary ray originating from the focal point of the camera and extending to a point in the image, such as a pixel located on the object of the scene, it is impossible to determine where upon the ray that pixel is located, and thus, it is unknown where the object is positioned within the scene.

There is ambiguity therefore with respect to the position of the object in the scene. Triangulation enables the recovery of this depth information so as to identify the position of an object in a scene, by determining where two rays intersect, one from each of two stereo cameras. Correspondence by a depth sensing camera solves this ambiguity by determining the depth Z (e.g., element 102 of FIG. 1A) to an object. Other three-dimensional (3D) processing methodologies exist besides correspondence based triangulation, such as laser time of flight and projection of coded light.

Nevertheless, using correspondence processing, given two or more images of the same three-dimensional scene, taken from different points of view via the two or more lenses (right camera 105 and left camera 110) of the stereo camera, the correspondence processing identifies a set of points in one image which can be correspondingly identified as the same points in another image by matching points or features in one image with the corresponding points or features in another image.

Thus, by way of example, for every point in the image on the left taken by the left camera 110 the correspondence processing searches for a match in the right image taken by the right camera 105. The pixel-shift needed to achieve a match is called disparity as depicted at element 145. According to such an embodiment, disparity 145 is calculated for all of the pixels in a captured image.

In such a way, the stereo camera having both the left camera 110 and right camera 105 to capture a scene seeks to determine a depth from the position of the camera to, ideally, every pixel of an object (e.g., objects 120 and 125) within a captured image via triangulation which operates by calculating the intersection between two rays, each of the two rays originating from the two different optical systems of the left and right cameras (105 and 110). The term "ray" is in reference to the mathematical object and the term "ray" is not in reference to any projection (e.g., radiating light) by the depth camera, which are referred to herein as projections, beams, laser light, infrared light, VCSEL emissions or VCSEL laser, etc. A ray is a half of a line, that is to say, a straight line starting at an initial point and extending to infinity in a direction and having no curvature, for which there is only one dimension, namely length, without width nor depth. As used herein, the mathematical object "ray" is therefore distinguished from a "beam" which is an optical term.

Figure 1C:
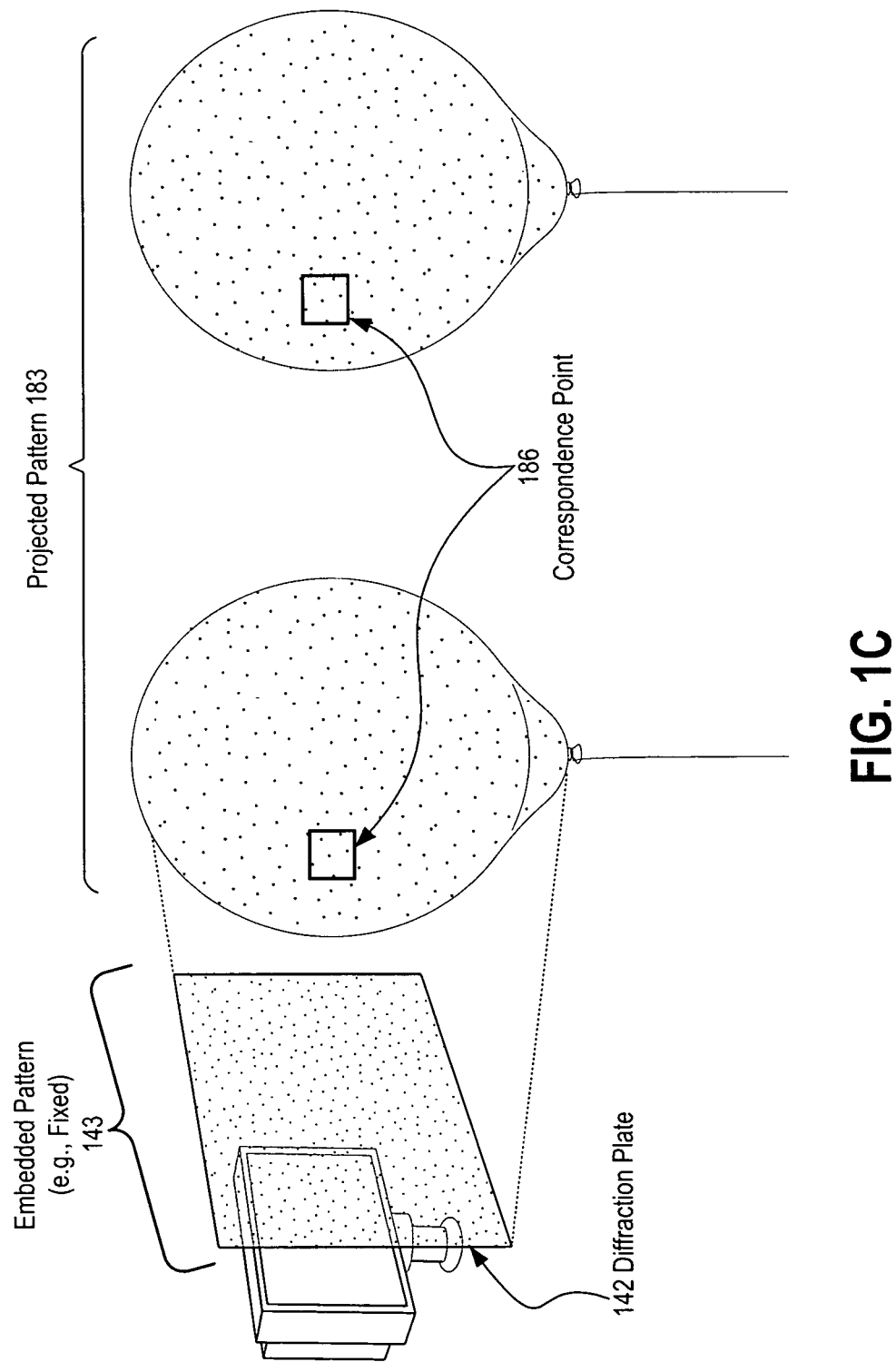
FIG. 1C illustrates another exemplary architecture in accordance with which embodiments may operate.

FIG. 1C illustrates another exemplary architecture in accordance with which embodiments may operate. In particular, there is depicted a correspondence point 186 identified on an object in the scene. Diffraction plate 142 causes an embedded pattern 143 to be projected onto the scene resulting in a projected pattern 183 on the object in the scene.

Certain 3D imaging and depth sensing systems have incorporated a laser projector to improve and "assist" with correspondence processing, however, the conventional solutions applied to 3D imaging and depth sensing systems suffer from a variety of drawbacks.

Assisted imaging provides some texture onto an otherwise featureless scene to resolve the problem of aliasing where a point being searched for from a first image to determine correspondence is not unique in a second image, such that the point repeats itself in a number of different locations, therefore making the point's unique location indeterminable and thus confusing the correspondence processing and in turn making it impossible to determine disparity with certainty for that point as there is not a 1:1 correspondence for the point within the two images.

Conventional systems utilizing correspondence derived triangulation suffer from a kind of depth blindness in the presence of a scene which is void of detail. Consider for instance such a conventional camera which captures left and right stereo images of a white wall. Such a system cannot calculate correspondence for such a featureless scene, and as such, is simply unable to perform the subsequent triangulation. Though a white wall may be an extreme example, it is quite common for smaller areas of a captured scene to have portions that lack sufficient detail with which to compute correspondence, due to, for instance, lighting, distance, a lack of pixel density, and so forth, and this inability for such conventional cameras to compute correspondence for those sub-areas of the captured scene result in significant error in the depth computations and degradation of depth determining performance.

Projecting a pattern onto the scene with spots or texture improves accuracy of the depth determination and improves resolution for the depth determination algorithms even for objects or scenes lacking in sufficient natural texture or detail. Therefore, the depth camera as is described herein introduces an active component into the scene to produce active stereo imagery using a VCSEL projector with a controlled projection lens.

In "assisted" or "active" stereoscopic depth camera systems the optical projection system improves performance and coverage. The projector serves to illuminate the scene with a textured pattern so that when the left and right cameras (105 and 110) capture the scene, the 3D circuitry of the depth sensing camera will be able to solve the correspondence problem and find which points in the left image match those in the right image, even for those cases where the natural scene lacks sufficient natural texture, such as is common with walls and tables.

The projected pattern 183 forms a non-uniform light on objects in the scene to create a texture such that correspondence may be solved by the depth sensing camera.

Problematically, conventional solutions utilize an embedded pattern 143 which is fixed for the particular system. Such an embedded pattern 143 may be specially optimized for the specific depth algorithm used to determine the depth by that system, but lacks the ability to adapt to other depth determination algorithms such as may be required for different distances or varying amounts of ambient light in the scene.

Such conventional solutions typically utilize a single laser emitter that transmits the beams through a diffuser, a diffractive optical element, or holographic optical element which in turn results in a far field pattern that has the proper spatially varying illumination pattern as the projected pattern 183 specifically optimized for the particular depth determination algorithm used by that system. However, because the single laser emitter transmits the beams through a diffuser or holographic optical element, it is not possible to alter the projected pattern 183. It further is not possible to alter the contrast or shape of the projected pattern, and as such, the resulting projected pattern 183 may not be suitable for the particular scene, lighting conditions, distance, or selection of available depth determination algorithms which vary from the optimized depth and scene conditions.

Moreover, the single laser of such conventional solutions exhibit residual spatial and temporal coherence that degrade the optical performance of such systems. Still further, because the projected pattern is fixed, it is not possible to illuminate the scene without forming the projected pattern 183 because the single laser emitter transmits through the diffuser or holographic optical element.

Figure 2:
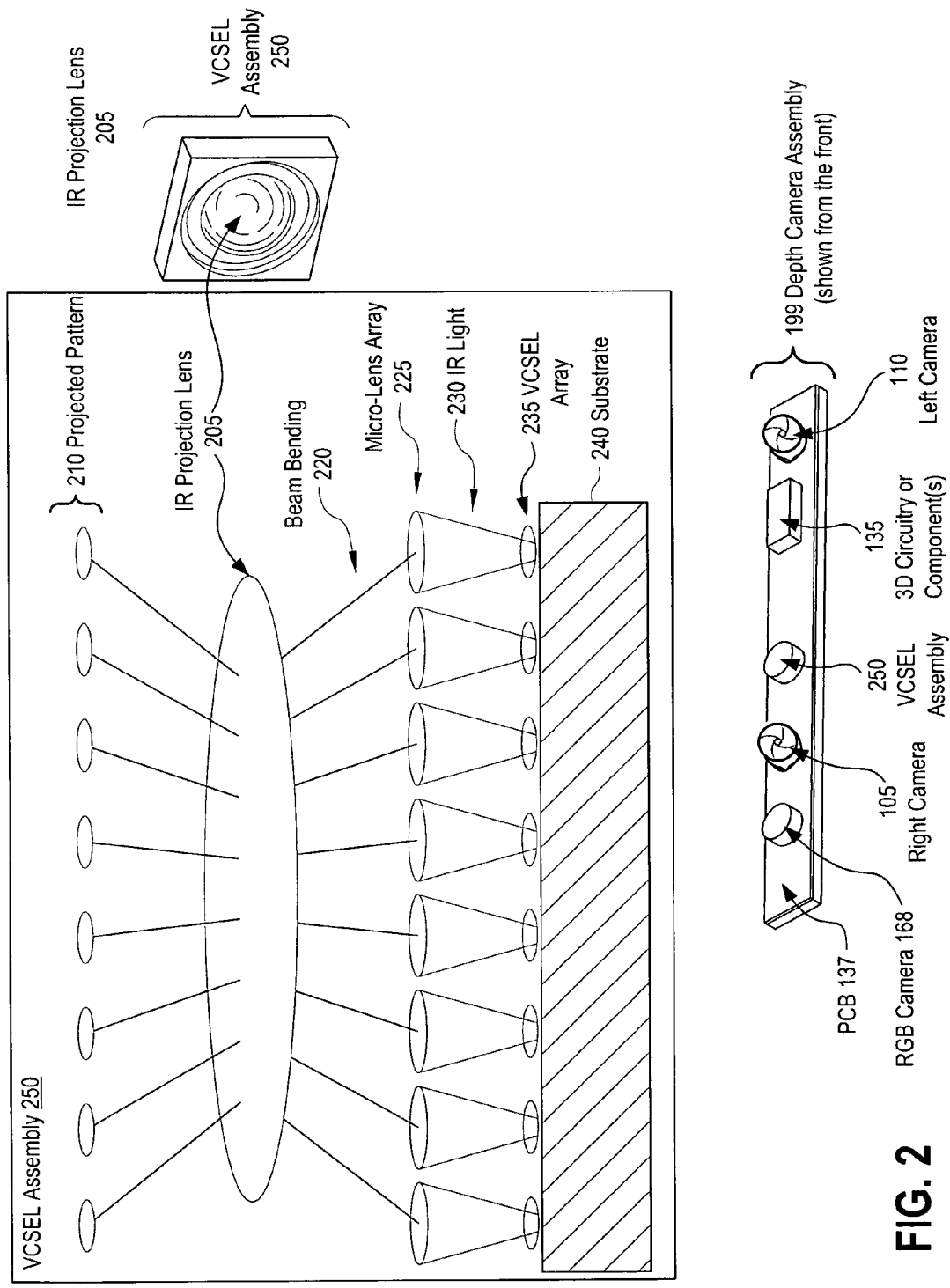
FIG. 2 illustrates an exemplary architecture in accordance with which embodiments may operate.

FIG. 2 illustrates an exemplary architecture in accordance with which embodiments may operate. In particular, depth camera assembly 199 is again depicted (shown from the front) having a printed circuit board (PCB) 137 upon which there are 3D circuitry or components 135, an RGB camera 168, a right camera 105 and a left camera 110. Further depicted is a VCSEL assembly 250. Depicted via the box above is the VCSEL assembly 250 having a substrate 240, the VCSEL array 235, infrared light (IR light) 230, a micro-lens array 225, an IR projection lens 205, and a projected pattern 210.

The VCSEL array 235 or "Vertical-Cavity Surface-Emitting Lasers" projectors are a type of semiconductor laser diode with laser beam emissions which are perpendicular from the top surface, in contrast to the more conventional single edge-emitting and in-plane semiconductor laser.

The VCSEL array assembly 250 operating as an infrared projector with an IR projection lens 205 of controllable focus can therefore be utilized to dynamically to enhance such a depth sensing system by altering the resulting projected pattern 210 cast onto a scene whereas prior solutions are limited by the embedded pattern for which they are optimized.

An exemplary VCSEL array 235 chip has thousands (e.g., 1000s) or tens of thousands (e.g., 10,000s) of small vertical cavity surface emitting lasers in which the position of the individual VCSEL lasers on the chip are lithographically determined and as such, the pattern may be optimized according to the needs of the manufacturer. Moreover, because the VCSEL array 235 contains many individual VCSEL lasers that are controllable as individual units or in batches, a wide variety of patterns may likewise be produced, each dynamically controllable with quality and contrast and density and brightness so as to produce the most beneficial illumination for the depth determination algorithm being applied to a particular scene.

In accordance with one embodiment a pattern is specified via X,Y coordinates to establish a desired pattern. For instance, a manufacturer may produce the VCSEL assembly 250 with its VCSEL array 235 established according to the specified pattern.

The micro-lens array 225 provides beam bending 220 of the beams of IR light 230 emitted from the VCSEL array 235 such that the beams are more efficiently collected by the IR projection lens 205 as shown. The micro-lens array 225 bends the IR light toward the IR projection lens 205 and thus concentrates the IR light emitted from the VCSEL array 235 onto a smaller optical viewpoint of the IR projection lens 205 by changing the angles of the emitted IR light, and thus lessening the Chief Ray Angle (CRA). In such a way, the micro-lens array 225 changes the functional distance from the center to match the Chief Ray Angle (CRA) of the IR projection lens 205. The IR light emitted from the VCSEL array 235 is then projected out through the IR projection lens 205 thus creating the projected pattern 210 in the scene.

The IR light emitted from the VCSEL array 235 may be, but is not necessarily, diffracted in any way. In certain embodiments, there is no diffraction by the IR projection lens 205 whereas in other embodiments the IR projection lens 205 diffracts the IR light emitted from the VCSEL array 235 to a varying degree.

In accordance with one embodiment, use of the VCSEL assembly 250 permits the projected pattern 210 to be changed dynamically during operation by varying focus to increase or decrease diffraction. Such operation is in contrast to the fixed and non-changeable pattern produced by conventional solutions. For instance, according to such an embodiment, the contrast and the quality of the pattern projected onto the scene via the VCSEL assembly 250 may be adjusted to suit any one of many available depth determination algorithms or adjusted to suit the real-time lighting conditions or the conditions of the scene, such as a scene with objects far away, objects near to the camera, facial recognition via depth sensing, drone and robot navigation, etc.

Because the projected pattern 210 may be changed dynamically, an appropriate algorithm may be selected to attain the best results possible at a number of different distances from the camera. For instance, depth determination algorithms optimized to near object depth determination may be different than depth determination algorithms optimized to far object depths, and each very likely will require a different projected pattern 210 for optimal performance.

Because conventional depth sensing cameras cannot alter the projected pattern created from the single laser emitter during operation, such conventional cameras must be optimized for near fields performing depth determination of objects very close to the camera or optimized for far fields performing depth determination of objects farther from the camera. Unfortunately, such optimization for near/far fields results in performance which degrades as the object moves from the near field to the far field or vise-versa.

In accordance with another embodiment, use of the VCSEL assembly 250 permits not just the projected pattern 210 to be changed dynamically during operation, but further permits the quality or contrast, or both, to be altered during operation of such a depth sensing camera. For instance, in one embodiment, the projected pattern is a focused pattern while in other embodiments, the pattern is de-focused resulting in the projected pattern being completely washed out, thus producing uniform illumination of the scene without projecting any particular pattern onto the scene.

According to a particular embodiment, the VCSEL assembly 250 changes the projected pattern during operation from a spot pattern to a pattern with a more continuous distribution and lower contrast. Consider for instance the difference in depth determination algorithms and use cases between identifying the depth to an inanimate object in a scene, such as a wall, a balloon, or a ball, etc., each of which are likely to benefit from a higher contrast projected pattern versus determining depth to elements of a human face for facial recognition purposes which favors uniform illumination.

In accordance with described embodiments, the VCSEL assembly 250 changes the focus of the projected pattern via the IR projection lens 205 permitting the quality and contrast of the projected pattern 210 to be altered during operation, for instance, from a sharply focused high contrast spot pattern to a diffuse, washed out, and uniform illumination by a projected pattern 210 which has been defocused (e.g., made blurry) by the IR projection lens of the VCSEL assembly 250.

As depicted here, the depth camera assembly 199 further includes an RGB (Red, Green, Blue) camera 168 in accordance with one embodiment. For instance, in such an embodiment, the VCSEL assembly 250 projects the projected pattern 210 onto the scene in an infrared light range and the right camera 105 and left camera 110 operate as detectors to capture the projected pattern 210 from the scene in the infrared light range. Therefore, the RGB camera 168 operates to capture RGB images of the scene in a visible light range.

Figure 3:
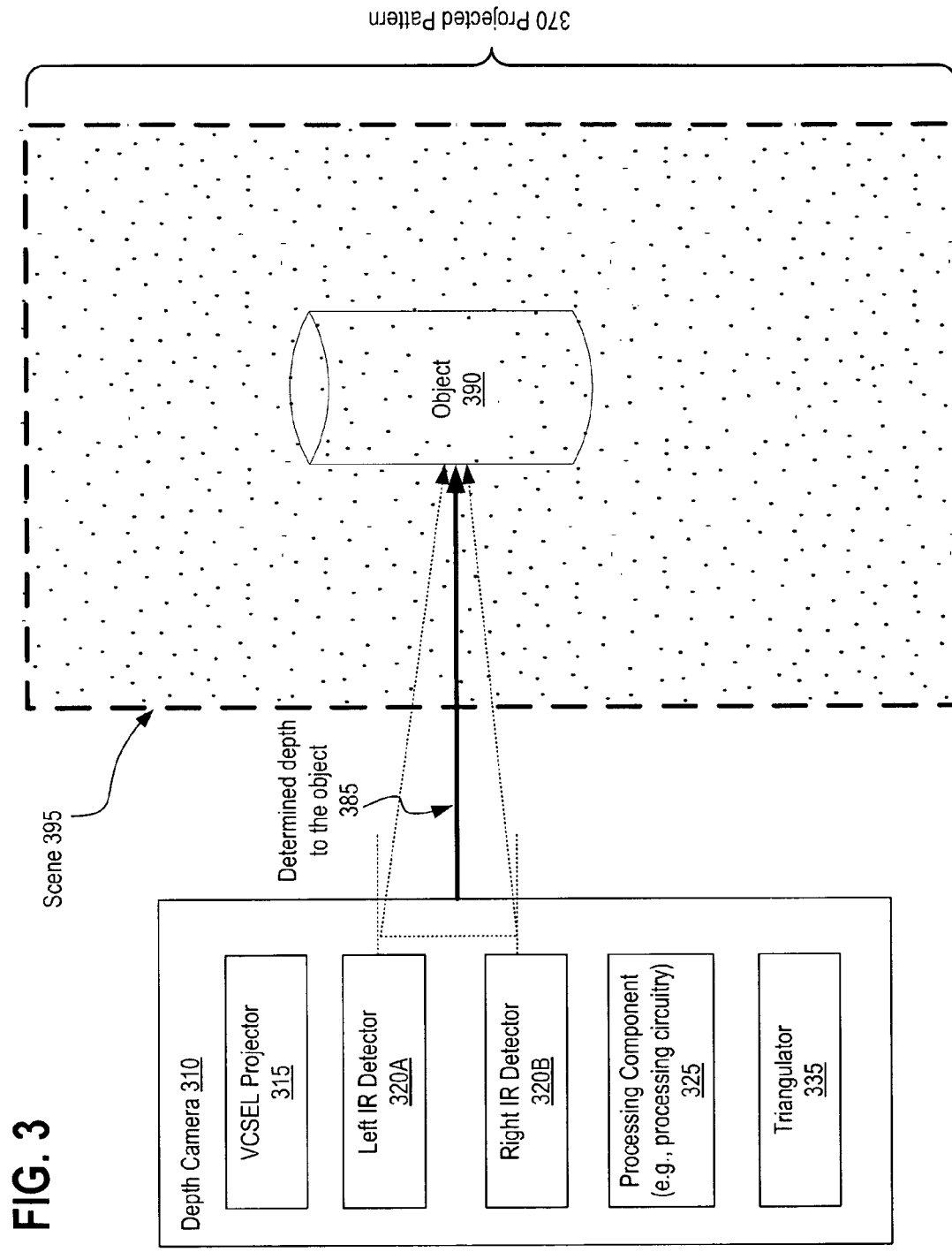
FIG. 3 illustrates an exemplary architecture in accordance with which embodiments may operate.

FIG. 3 illustrates an exemplary architecture in accordance with which embodiments may operate. In particular, there is shown a depth camera 310 which determines depth 385 to an object 390 in a scene 395. The scene 395 is illuminated by the projected pattern projected by the VCSEL projector 315.

In accordance with a particular embodiment, such a depth camera 310 includes the VCSEL projector 315 to project the projected pattern 370 onto the scene, a left IR detector 320A to capture a first image of the object 390 having the projected pattern 370 illuminated thereupon and a right IR detector 320B to capture a second image of the object 390 having the projected pattern 370 illuminated thereupon. Processing component 325 operates in conjunction with the triangulator 335 to perform correspondence and triangulation to determine the depth 385 to the object 390 in the scene 395.

Figure 4:
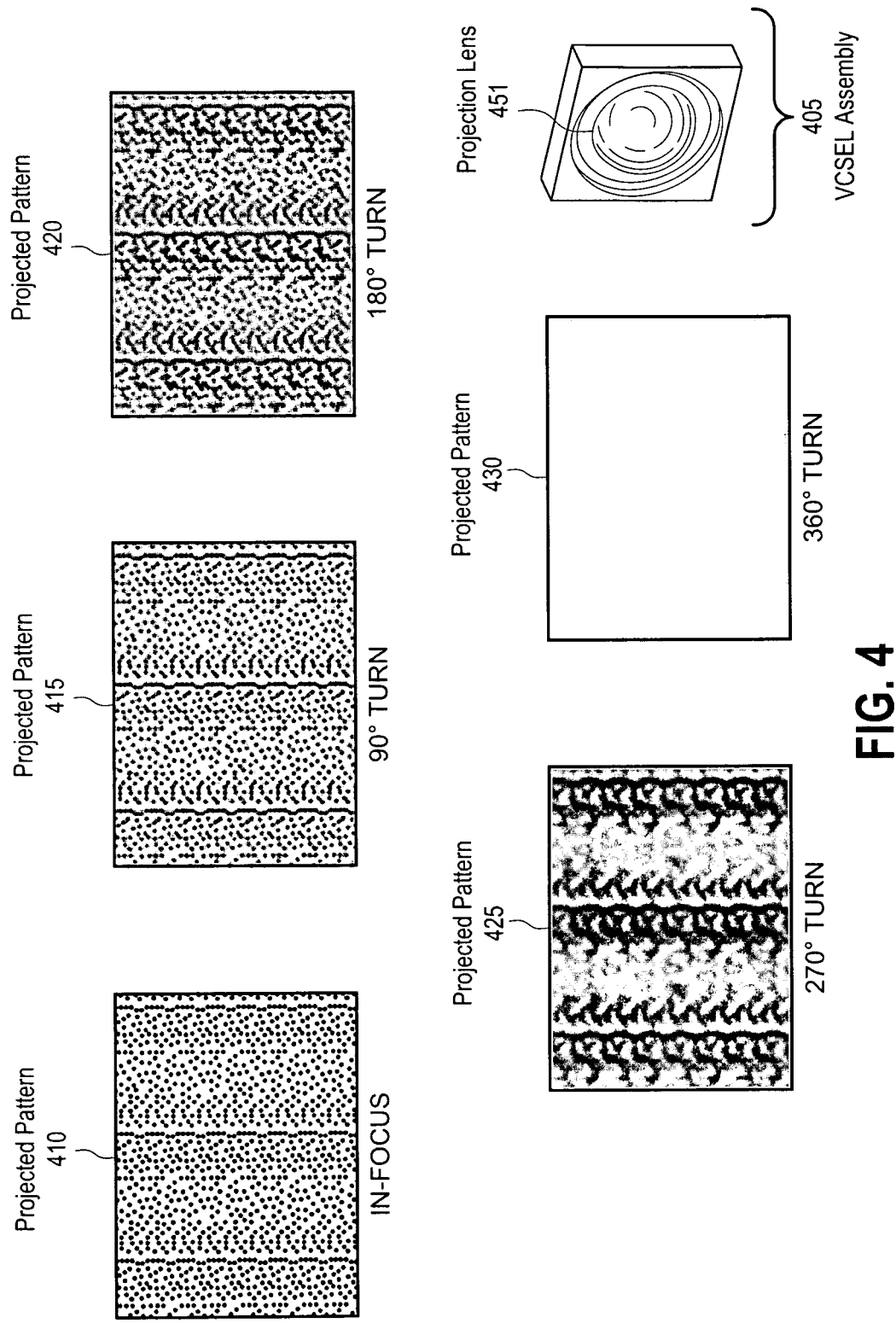
FIG. 4 illustrates an exemplary projected pattern which is dynamically alterable in accordance with which embodiments may operate.

FIG. 4 illustrates an exemplary projected pattern which is dynamically alterable in accordance with which embodiments may operate. In particular, there is shown the same projected pattern but for which the projected pattern ranges from being fully focused to fully defocused and thus completely washed out and diffuse.

More specifically, projected pattern 410 at the top left depicts an in-focus projected pattern by the VCSEL array projector; projected pattern 415 at the top middle depicts an slightly defocused projected pattern by the VCSEL array projector for which the IR projection lens has been rotated by a 90-degree turn; projected pattern 420 at the top right depicts a more defocused projected pattern by the VCSEL array projector for which the IR projection lens has been rotated by a 180-degree turn; projected pattern 425 at the bottom left depicts a highly defocused projected pattern by the VCSEL array projector for which the IR projection lens has been rotated by a 270-degree turn; and projected pattern 430 at the bottom right depicts a completely defocused projected pattern by the VCSEL array projector for which the IR projection lens has been rotated by a 360-degree turn resulting in uniform illumination of the scene in the infrared range by the VCSEL array projector but for which there is no clearly discernable pattern projected onto the scene.

The projection lens 451 of the VCSEL assembly 405 may be an "auto focus lens" lens utilizing a VCM (Voice Coil Motor). Alternatively, the projection lens 451 of the VCSEL assembly 405 may consist of a membrane lens (e.g., a MEMs type lens or an adaptive fluidic silicone-membrane lens) which is placed on top of a fixed focus lens and serves the same autofocus function as the VCM lens. The voice coil motor permits the lens to be moved up or down which changes the focus resulting in a certain amount of increasing blur or increasing sharpness of focus on the projected pattern.

With the projection lens 451 of the VCSEL assembly 405 being controllable, much better control of the projected patterns (410, 415, 420, 425, and 430) is attainable in terms of contrast, blur, focus, etc. For instance, in certain cases a very high-contrast pattern (such as projected patterns 410 and 415) is preferred such as for objects that are far away, or in scenarios where there is a significant amount of ambient light. Conversely, in other cases, a 3D stereoscopic system benefits from a lower contrast projected pattern (such as projected patterns 420 and 425), for instance, as with low light environments and for objects that are nearer to the depth sensing camera.

Dynamically controllable focus thus permits the depth sensing system to be dynamically optimized at the time of use and to produce the best depth map for the particular conditions present within the scene.

In accordance with a particular embodiment, uniform illumination is most appropriate for the depth determination algorithm being utilized. With conventional solutions, uniform illumination in the infrared range is simply not feasible where an embedded pattern has been embodied into the optics through which the infrared laser light is transmitted. Nevertheless, in such a use case where uniform illumination is most appropriate, the projection lens 451 is entirely defocused such as that depicted by the 360-degree turn resulting in projected pattern 430, resulting in the projected pattern being de-focused to such an extreme point that the projection lens 451 completely blurs out the projected pattern 430 yet permits illumination of the scene by VCSEL assembly's laser array in the infrared range. In such a way, the same VCSEL assembly 405 lasers are utilized to generate both a uniform illumination of a scene which is useful for applications such as face recognition technologies in lieu of alphanumerical passwords and also detailed and focused projected patterns 410 which are more useful for determination of object depth.

When perfectly focused, the resulting projected pattern 410 produces a high contrast sharp pattern which may be most appropriate for depth determination algorithms with objects that are far away from the cameras. For objects farther way, a sharper and higher density profile or high contrast profile improves depth perception by the camera by producing a known pattern on the scene despite the distance from the camera.

Conversely, for objects nearer to the camera such a high density profile may produce too great of contrast, and as such, altering the focus through the projection lens 451 produces a less sharp projected pattern which exhibits a lower degree of contrast which may be more optimal for depth determination algorithms with objects that are nearer to the cameras.

The high contrast projected pattern may be less appropriate for close objects because it will result in some pixels at the detector lacking information because at a short distance there will be pixels that are dark and other pixels that are bright, resulting in a 0 or 1 brightness intensity in the image. However, at these short distances, it is more optimal if all the pixels have some information, such as a varying degree of brightness rather than 0 and 1 due to the extreme contrast. As such, altering the projected pattern by defocusing the projection lens 451 produces some blur, spreading out the light over a greater area, while retaining some pattern projected onto the image, and thus, improves depth determination accuracy for objects near in the scene. In such a way, rather than the detectors observing essentially a binary result attributable to the high contrast spots, the detectors observe more of a sinusoidal wave type projected pattern in which information in the scene ranges from, for example, 75 percent to 25 percent and back to 75 again, rather than having sharp changes between 0% and 100% or 0 and 1 pixel brightness.

In such a way, the projection lens 451 provides for a high dynamic range such that performance for depth determination of objects near to the camera and performance for depth determination of objects more distant from the camera are equalized through the dynamic varying of the projected pattern, where as prior solutions required optimization of the projected pattern for a specific distance, with other non-optimized distances suffering by a degradation in depth determination capability.

In accordance with another embodiment, brightness of the spots within the projected pattern is varied to accommodate changing or different ambient light conditions in the scene. Consider for example a scene in direct sunlight versus a scene indoors. The defocused projected patterns (e.g., 415, 420, 425) may be sufficiently bright to be observed by the cameras indoors, but when utilized in direct sunlight, may be completely washed out by the brightness of the sun. In such a case, it may therefore be preferable to project each spot produced by the VCSEL assembly 405 at full (100%) brightness and fully focused producing a high intensity spot, such that the detectors may observe the location of the spots in the projected pattern, even in sunlight.

In accordance with another embodiment, depth sensing is varied between near and far depth determination in an iterative cycle to produce far depth determination optimized projection patterns and near depth determination optimized projection patterns. Consider for instance an autonomous drone or a self driving vehicle which must, by definition, navigate without the aid of human intervention. Such a system requires disparate depth determination mechanisms, including at least one for far distances to observe the general scene and macro scale obstacles (such as a distant building, landing strip, etc.) and one for near distances to observe with great precision close objects (such as a tree or a moving object such as another vehicle in the near range which risks collision). Prior solutions require either a compromise for depth determination or multiple distinct systems which add to cost, complexity, package size, and power requirements. Conversely, use of the projection lens 451 permits application of depth determination to vary iteratively between optimization for near objects and optimization for far objects, without requiring multiple systems, thus reducing cost, complexity, package size, and power requirements.

In accordance with another embodiment, the VCSEL assembly 250 is used to reduce speckle noise in the scene associated with a coherent light source, such as the single laser emitter light source associated with conventional solutions. Speckle noise is known to originate from such single laser emitter light sources which creates interference patterns via coherent illumination of the scene and in turn degrades depth determination capabilities.

Given a coherent light source such as a single laser emitter, two images captured via stereoscopic cameras will exhibit a significant amount of speckle or noise because of interference from the target resulting from the laser light reflecting back from the target. This speckle noise significantly compromises resolution and accuracy attainable in terms of depth to an object and also in terms of high resolution between two closely spaced objects and the ability determine how far apart those two closely spaced objects are from one another.

Such speckle noise is a well known phenomenon and problem with infrared single laser emitter infrared projectors used by conventional solutions. Residual laser speckle adversely affects the RMS error (Root-Mean-Square Error or RMSE) by approximately 30% in conventional depth sensing systems.

In accordance with one embodiment, speckle noise is reduced by the VCSEL assembly 250 by simulating motion into the imaging. In accordance with such an embodiment the IR projection lens 205 embodies an autofocus lens and the IR projection lens 205 dynamically an iteratively changes the focus of the spot within the projected pattern 210 to simulate motion in the imaged scene by the detectors (e.g., the right camera 105 and the left camera 110). The iterative focusing and defocusing by the lens of the projected pattern creates a movement in the projected pattern which in turn reduces the speckle noise observed by the IR imagers/detectors (e.g., the right camera 105 and the left camera 110).

In accordance with an alternative embodiment, speckle noise is reduced by the VCSEL assembly 250 by inducing lateral motion into the imaging using a MEMs type lens at the IR projection lens 205. In particular, a MEMs type lens produces lateral motion and shift in an XY plane by beam steering the projected pattern illuminating the scene.

In such a way the autofocus capabilities of the projection lens 451 permits a physical jitter or shaking of the lens in the X and Y and Z directions producing lateral shifting and increasing and decreasing contrast which nearly fully eliminates the speckle noise and thus in turn yields a nearly 30% improvement in depth determination accuracy over conventional solutions.

Figure 5:
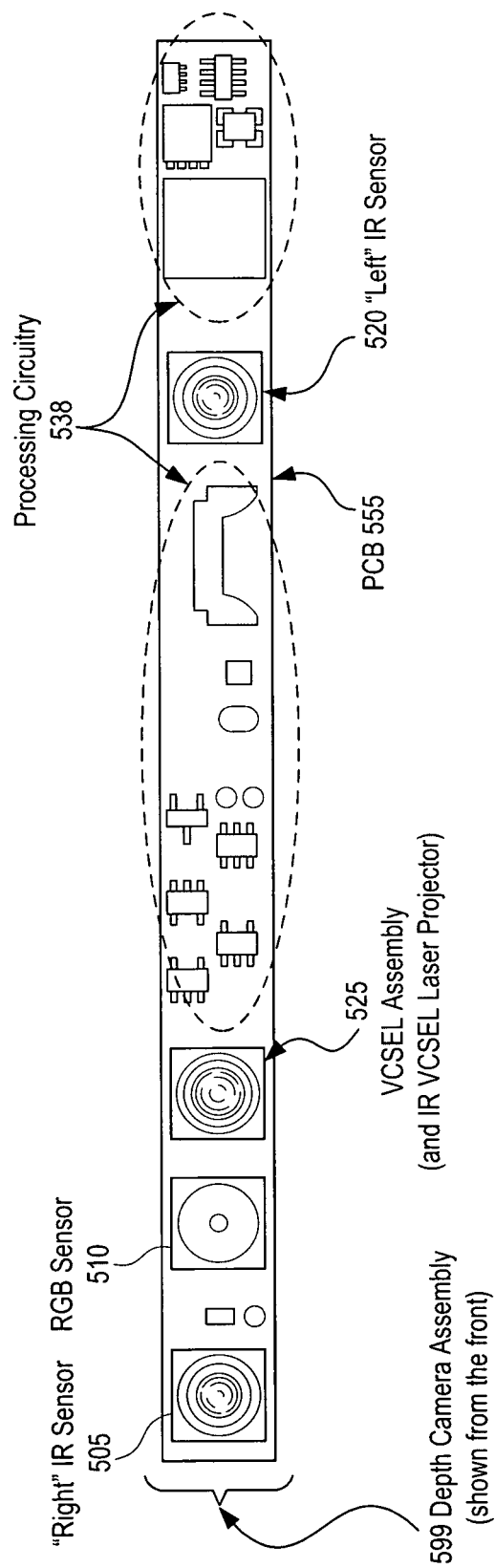
FIG. 5 illustrates an alternative embodiment of a depth camera assembly in accordance with which embodiments may operate.

FIG. 5 illustrates an alternative embodiment of a depth camera assembly 599 in accordance with which embodiments may operate. In particular, depth camera assembly 599 is depicted (shown from the front) having thereupon both a "right" IR sensor 505 and a "left" IR sensor 520 to detect light in the infrared range, such as a projected pattern illuminating a scene as projected by the VCSEL assembly 525 and IR VCSEL laser projector. Further depicted is an RGB sensor 510 and processing circuitry 538 on the printed circuit board (PCB) 555.

Figure 6:
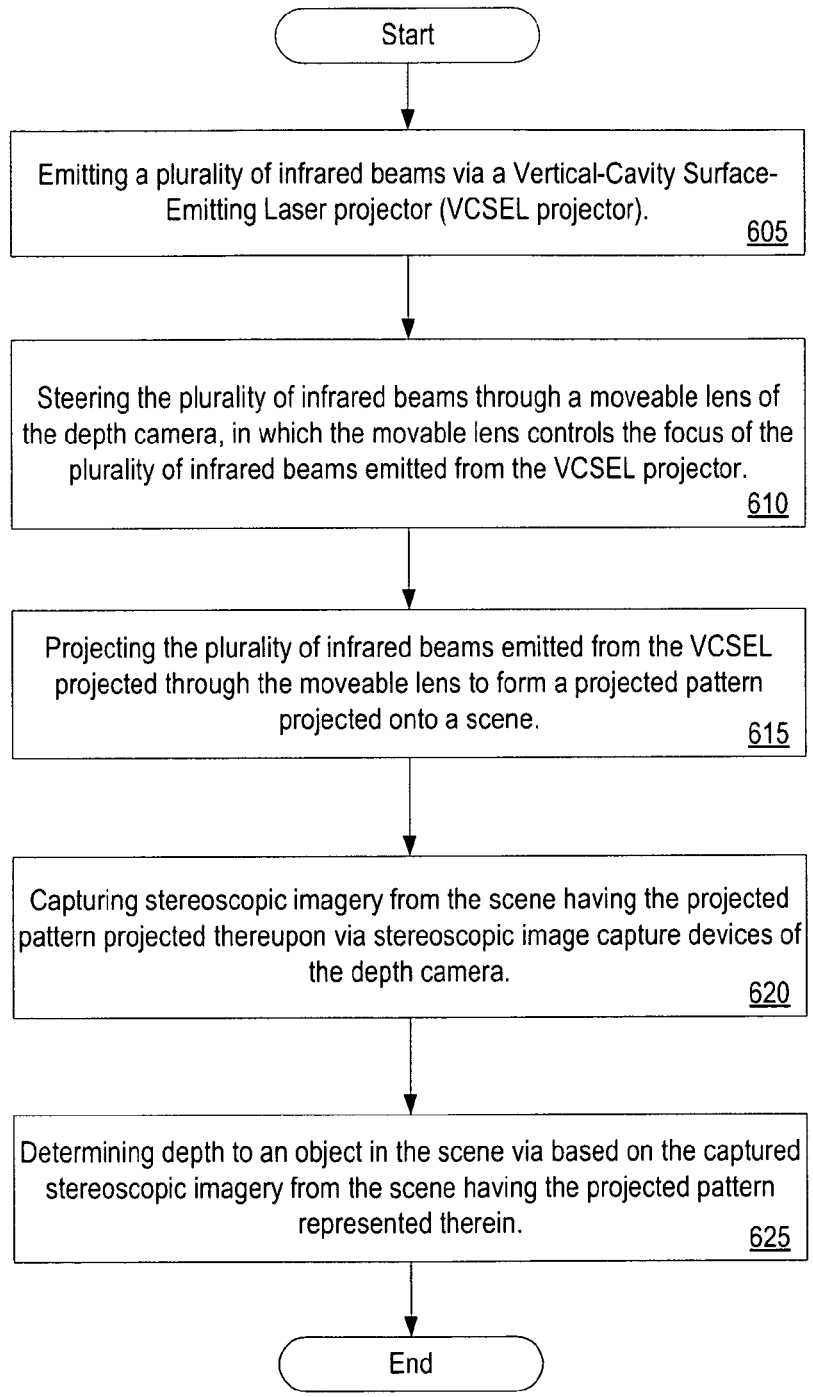
FIG. 6 is a flow diagram illustrating a method for implementing a stereodepth camera using a VCSEL (Vertical-Cavity Surface-Emitting Laser) projector with a controlled projection lens in accordance with the described embodiments.

FIG. 6 is a flow diagram illustrating a method 600 for implementing a stereodepth camera using a VCSEL (Vertical-Cavity Surface-Emitting Laser) projector with a controlled projection lens in accordance with the described embodiments.

Figure 7A:
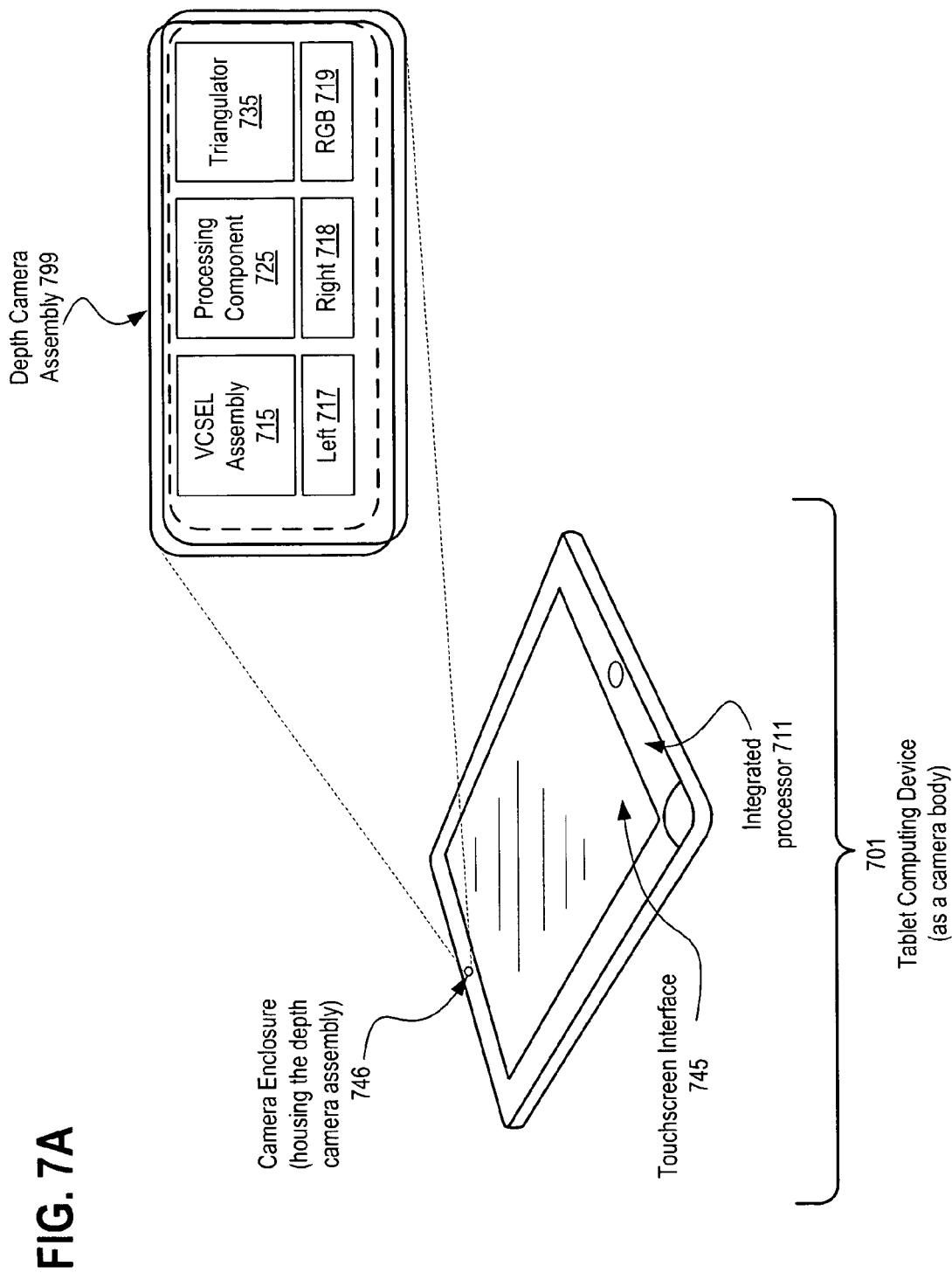
FIG. 7A illustrates an exemplary tablet computing device with a camera enclosure housing the depth camera assembly in accordance with described embodiments.
Figure 7B:
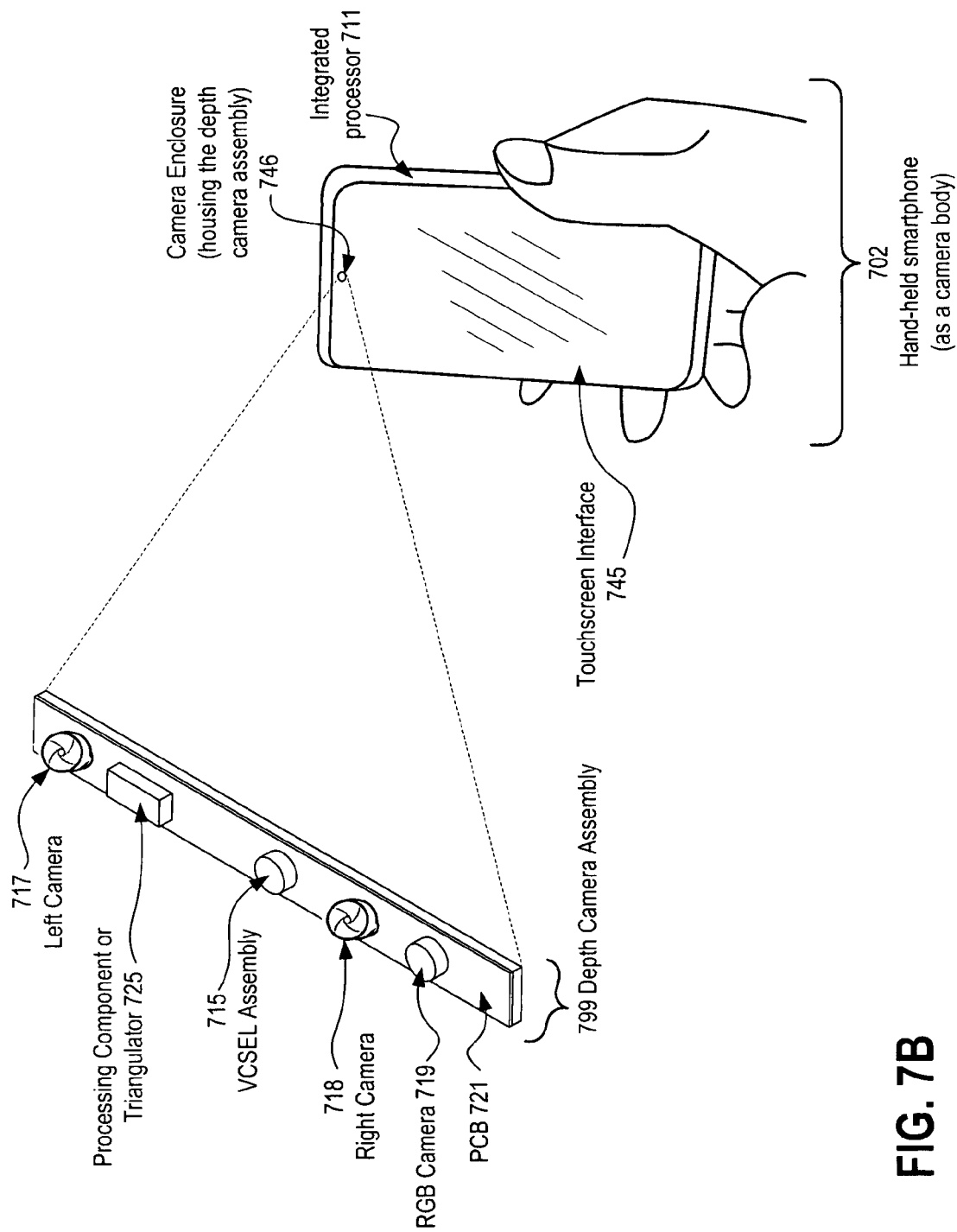
FIG. 7B illustrates an exemplary hand-held smartphone with a camera enclosure housing the depth camera assembly in accordance with described embodiments.
Figure 7C:
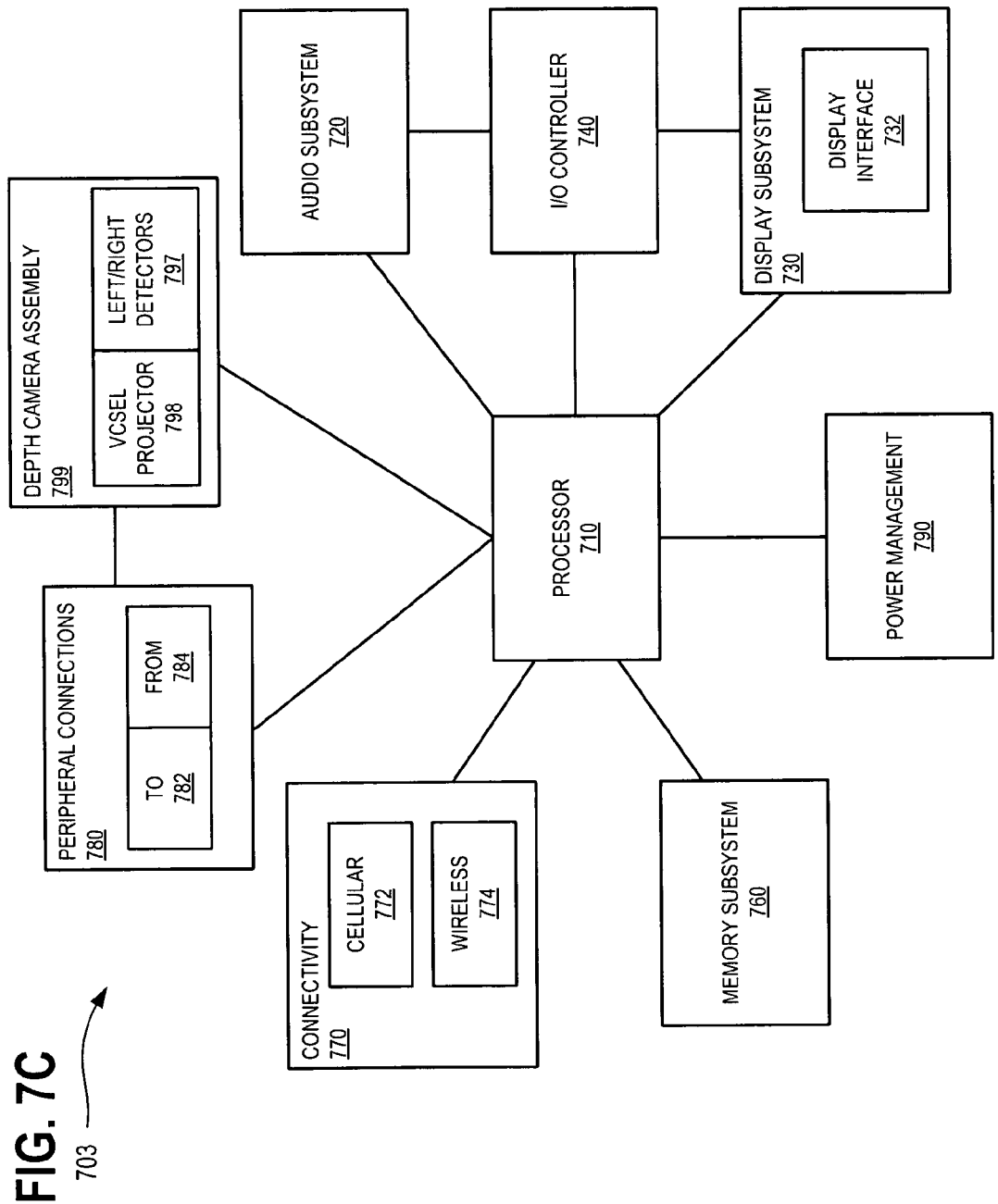
FIG. 7C is a block diagram of an embodiment of tablet computing device, a smart phone, or other mobile device in which touchscreen interface connectors are used.

Some of the blocks and/or operations listed below for method 600 are optional in accordance with certain embodiments. The numbering of the blocks presented is for the sake of clarity and is not intended to prescribe an order of operations in which the various blocks must occur. Method 600 may be performed by processing logic that may include hardware (e.g., circuitry, dedicated logic, programmable logic, microcode, etc.), software (e.g., instructions run on a processing device) to perform various operations such as emanating, steering, projecting, capturing, adjusting, outputting, triangulating, focusing, defocusing, normalizing, controlling, analyzing, collecting, monitoring, executing, presenting, interfacing, receiving, processing, determining, triggering, displaying, etc., in pursuance of the systems and methods as described herein. For example, depth camera assemblies 199, depth camera 310, depth camera assembly 599, as depicted at FIGS. 1, 2, 3 and 5, the smart phone or tablet computing devices as depicted at FIGS. 7A, 7B, and 7C, or the machine 800 at FIG. 8, may implement the described methodologies.

With reference to method 600, operations begin at block 605 by emitting a plurality of infrared beams via a Vertical-Cavity Surface-Emitting Laser projector (VCSEL projector).

At block 610 operations include steering the plurality of infrared beams through a moveable lens of the depth camera, in which the movable lens controls the focus of the plurality of infrared beams emitted from the VCSEL projector.

At block 615 operations include projecting the plurality of infrared beams emitted from the VCSEL projected through the moveable lens to form a projected pattern projected onto a scene.

At block 620 operations include capturing stereoscopic imagery from the scene having the projected pattern projected thereupon via stereoscopic image capture devices of the depth camera.

At block 625 operations include determining depth to an object in the scene via based on the captured stereoscopic imagery from the scene having the projected pattern represented therein.

In accordance with a particular embodiment of method 600, the plurality of infrared beams emitted by the VCSEL projector includes light from the VCSEL projector imaging the VCSEL projector's surface pattern onto the scene through the moveable lens.

In accordance with another embodiment of method 600, the VCSEL projector's surface pattern is lithographically determined according to X,Y coordinates specified at a time of manufacture for the VCSEL projector; and in which the VCSEL projector images the VCSEL projector's surface pattern onto the scene through the moveable lens, the projected surface pattern corresponding to the X,Y coordinates specified.

In accordance with another embodiment of method 600, the moveable lens to control the focus of the plurality of infrared beams emitted from the VCSEL projector includes a controllable lens movable laterally in an X and Y direction of a horizontal plane parallel with the VCSEL projector and moveable back and forth in a Z direction of a vertical plane perpendicular to the VCSEL projector.

In accordance with another embodiment of method 600, the moveable lens to control the focus of the plurality of infrared beams emitted from the VCSEL projector includes one of a membrane lens or an adaptive fluidic silicone-membrane lens to control the focus of the plurality of infrared beams emitted from the VCSEL projector or a Voice Coil Motor (VCM) type lens to control the focus of the plurality of infrared beams emitted from the VCSEL projector.

In accordance with another embodiment of method 600, the stereoscopic image capture devices to capture stereoscopic imagery from the scene having the projected pattern projected thereupon includes a left infrared camera to capture a left image of the scene having the projected pattern represented therein and a right infrared camera to capture a right image of the scene having the projected pattern represented therein.

In accordance with another embodiment of method 600, the processing circuitry determines the depth to the object in the scene by determining correspondence for each of a plurality of points in the captured left and right images and triangulating a distance to each of the plurality of points in the captured left and right images using disparity.

In accordance with another embodiment of method 600, the depth camera is to perform assisted or active stereoscopic depth determination via an optical projection emanating from the VCSEL projector to illuminate the scene with a textured pattern. According to such an embodiment, the assisted or active stereoscopic depth determination provides an observable texture in the infrared light range by which the stereoscopic image capture devices of the depth camera capture stereoscopic imagery with the observable texture to improve correspondence determination by the processing circuitry for a scene which lacks sufficient natural texture by which to accurately determine correspondence.

In accordance with another embodiment of method 600, the VCSEL projector includes a micro-lens array to beam steer the plurality of infrared beams emitted by a VCSEL array of the VCSEL projector toward a center of the moveable lens before the plurality of infrared beams are projected through the moveable lens to form the projected pattern on the scene.

In accordance with another embodiment of method 600, the moveable lens dynamically alters the projected pattern projected onto the scene by varying focus of the movable lens to increase or decrease diffraction of the projected pattern.

In accordance with another embodiment of method 600, the plurality of infrared beams are projected through the moveable lens in full focus by the movable lens to form a high contrast representation of the projected pattern projected onto the scene or alternatively are projected through the moveable lens fully defocused by the movable lens to form a low contrast and fully diffused representation of the projected pattern projected onto the scene.

In accordance with another embodiment of method 600, the plurality of infrared beams are projected through the moveable lens and are fully defocused by the movable lens to provide uniform illumination of the scene for a facial recognition depth determination algorithm.

In accordance with another embodiment of method 600, the movable lens changes a focus of the projected pattern projected onto the scene based on a quantity of ambient light present in the scene.

In accordance with another embodiment of method 600, the movable lens changes a focus of the projected pattern projected onto the scene according to a selected depth determination algorithm, in which the selected depth determination algorithm is optimized for objects nearer to the depth camera or alternatively optimized for objects farther from the depth camera.

In accordance with another embodiment, the method 600 is performed by a depth camera which is embodied within a drone or self-navigating robot. According to such an embodiment, the processing circuitry is to iteratively cycle between a near field depth determination algorithm and a far field depth determination algorithm; and further in which the processing circuitry instructs the moveable lens to iteratively change the focus of the projected pattern projected onto the scene through the movable lens according to a degree of focus optimized for each of the near field depth determination and far field depth determination algorithms respectively.

In accordance with another embodiment of method 600, the processing circuitry is to adjust for ambient illumination and reflection properties of the scene by increasing or decreasing a contrast of the projected pattern projected upon the scene by increasing or decreasing focus of the projected pattern projected upon the scene via the movable lens.

In accordance with another embodiment of method 600, the processing circuitry is to reduce speckle in the scene by simulating movement in the scene as captured by the stereoscopic image capture devices by iteratively focusing and defocusing the projected pattern projected upon the scene via the movable lens.

In accordance with another embodiment of method 600, the movable lens is to reduce speckle in the scene by inducing lateral movement of the movable lens causing iterative shifting of the projected pattern projected upon the scene as captured by the stereoscopic image capture devices.

In accordance with another embodiment of method 600, the movable lens is to reduce speckle in the scene by beam steering the plurality of infrared beams emitted from the VCSEL projector through the moveable lens to induce movement of the projected pattern projected onto the scene as captured by the stereoscopic image capture devices.

In accordance with another embodiment, the method 600 is performed by a depth camera which further includes an RGB (Red, Green, Blue) camera to capture imagery of the scene in a visible light range.

In accordance with another embodiment of method 600, such a depth camera is embodied within one of: a gesture control module for a computer; a 3D photography module of a 3D camera; a 3D immersive gaming module of a gaming platform; a face recognition module to perform face recognition based security in-lieu of alphanumerical passwords; a drone navigation control module; a robot navigation control module; a smart phone; or a tablet.

In accordance with another embodiment there is a non-transitory computer readable storage medium having instructions stored thereupon that, when executed by a processor of a depth camera, the instructions cause the depth camera to perform operations including: emitting a plurality of infrared beams via a Vertical-Cavity Surface-Emitting Laser projector (VCSEL projector); steering the plurality of infrared beams through a moveable lens of the depth camera, in which the movable lens controls the focus of the plurality of infrared beams emitted from the VCSEL projector; projecting the plurality of infrared beams emitted from the VCSEL projected through the moveable lens to form a projected pattern projected onto a scene; capturing stereoscopic imagery from the scene having the projected pattern projected thereupon via stereoscopic image capture devices of the depth camera; and determining depth to an object in the scene via based on the captured stereoscopic imagery from the scene having the projected pattern represented therein.

FIG. 7A illustrates an exemplary tablet computing device 701 with a camera enclosure 746 housing the depth camera assembly 799 in accordance with described embodiments. FIG. 7B illustrates an exemplary hand-held smartphone 702 with a camera enclosure 746 housing the depth camera assembly 799 in accordance with described embodiments.

For instance, according to the depicted embodiment of FIG. 7A, the depth camera assembly 799 of the tablet computing device 701 is a camera body for the depth camera assembly having the necessary optics (e.g., lenses) of the VCSEL assembly 715 operating as a projector 715, left 717 and right 718 cameras operating as detectors, as well as the processing component 725, RGB 719 and triangulator 735. The depth camera assembly 799 is integrated within a hand-held smartphone 702 or tablet computing device 701 as a camera body for the depth camera assembly 799. Alternatively, according to the depicted embodiment of FIG. 7B, the depth camera assembly 799 of the hand-held smartphone 702 is a camera body for the depth camera assembly 799 having the necessary optics (e.g., lenses) of the VCSEL assembly 715 operating as a projector 715, the left camera 717 and right camera 718 operating as detectors, and the processing component or triangulator 725. RGB camera 719 and PCB 721 are further depicted.

In such a way, the depth camera assembly 799 may be integrated within a hand-held smartphone 702 or tablet computing device 701 as a camera body for the depth camera assembly 799.

In accordance with one embodiment, the hand held smartphone 702 or tablet computing device 701 having a touchscreen interface 745 integrated therein forms the camera body to which the depth camera assembly 799 is integrated or installed.

FIGS. 7A and 7B depict the tablet computing device 701 and the hand-held smartphone 702 each having a circuitry integrated therein as described in accordance with the embodiments. As depicted, each of the tablet computing device 701 and the hand-held smartphone 702 include a touchscreen interface 745 and an integrated processor 711 in accordance with disclosed embodiments.

For example, in one embodiment, a tablet computing device 701 or a hand-held smartphone 702, includes a display unit which includes a touchscreen interface 745 for the tablet or the smartphone and further in which memory and an integrated circuit operating as an integrated processor are incorporated into the tablet or smartphone, in which the integrated processor is operable in conjunction with the depth camera assembly 799 and its components and circuitry as described herein; the tablet or smartphone and its processing components being further operable to perform pattern projection, projected pattern capture and image processing including determining disparity and correspondence to determine depth information to an object of a scene. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

In accordance with a particular embodiment there is a camera body assembly, including: a camera body; a battery; a display; a processor and a memory to perform logic or instructions; a lens mount assembly, the lens mount assembly, including one or more optical components and Complementary metal-oxide-semiconductor (CMOS) components; and a depth camera assembly Printed Circuit Board (PCB) having affixed thereto: a Vertical-Cavity Surface-Emitting Laser projector (VCSEL projector) to emit a plurality of infrared beams; a moveable lens to control the focus of the plurality of infrared beams emitted from the VCSEL projector, in which the plurality of infrared beams are projected through the moveable lens to form a projected pattern projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector.

According to such an embodiment, the camera body includes one of: a gesture control system, a 3D photography system, a 3D immersive gaming system, a face recognition system to perform face recognition based security in-lieu of alphanumerical passwords, a drone or robot control system, a depth sensing camera system to perform any of stereoscopic imaging depth sensing, a hand-held stand-alone camera, a tablet computing device, and a hand-held smartphone; and in which the depth camera assembly PCB is integrated into the camera body by an Original Equipment Manufacturer (OEM) for the gesture control system, the 3D photography system, the 3D immersive gaming system, the face recognition system, the drone or robot control system, the depth sensing camera system, the hand-held stand-alone camera, the tablet computing device, or the hand-held smartphone.

FIG. 7C is a block diagram 703 of an embodiment of tablet computing device, a smart phone, or other mobile device in which touchscreen interface connectors are used. Processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Depth camera assembly 799 is depicted as communicably interfaced to the processor 710 and peripheral connections 780. Depth camera assembly 799 includes the VCSEL projector 798 and left/right detectors 797 (e.g., cameras).

Display subsystem 730 represents hardware (e.g., display devices) and software (e.g., drivers) components that provide a visual and/or tactile display for a user to interact with the tablet computing device or smart phone. Display subsystem 730 includes display interface 732, which includes the particular screen or hardware device used to provide a display to a user. In one embodiment, display subsystem 730 includes a touchscreen device that provides both output and input to a user.

I/O controller 740 represents hardware devices and software components related to interaction with a user. I/O controller 740 can operate to manage hardware that is part of an audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 790 that manages battery power usage, charging of the battery, and features related to power saving operation. Memory subsystem 760 includes memory devices for storing information in the tablet computing device or smart phone. Connectivity 770 includes hardware devices (e.g., wireless and/or wired connectors and communication hardware) and software components (e.g., drivers, protocol stacks) to the tablet computing device or smart phone to communicate with external devices. Cellular connectivity 772 may include, for example, wireless carriers such as GSM (global system for mobile communications), CDMA (code division multiple access), TDM (time division multiplexing), or other cellular service standards. Wireless connectivity 774 may include, for example, activity that is not cellular, such as personal area networks (e.g., Bluetooth), local area networks (e.g., WiFi), and/or wide area networks (e.g., WiMax), or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device or smart phone, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

Figure 8:
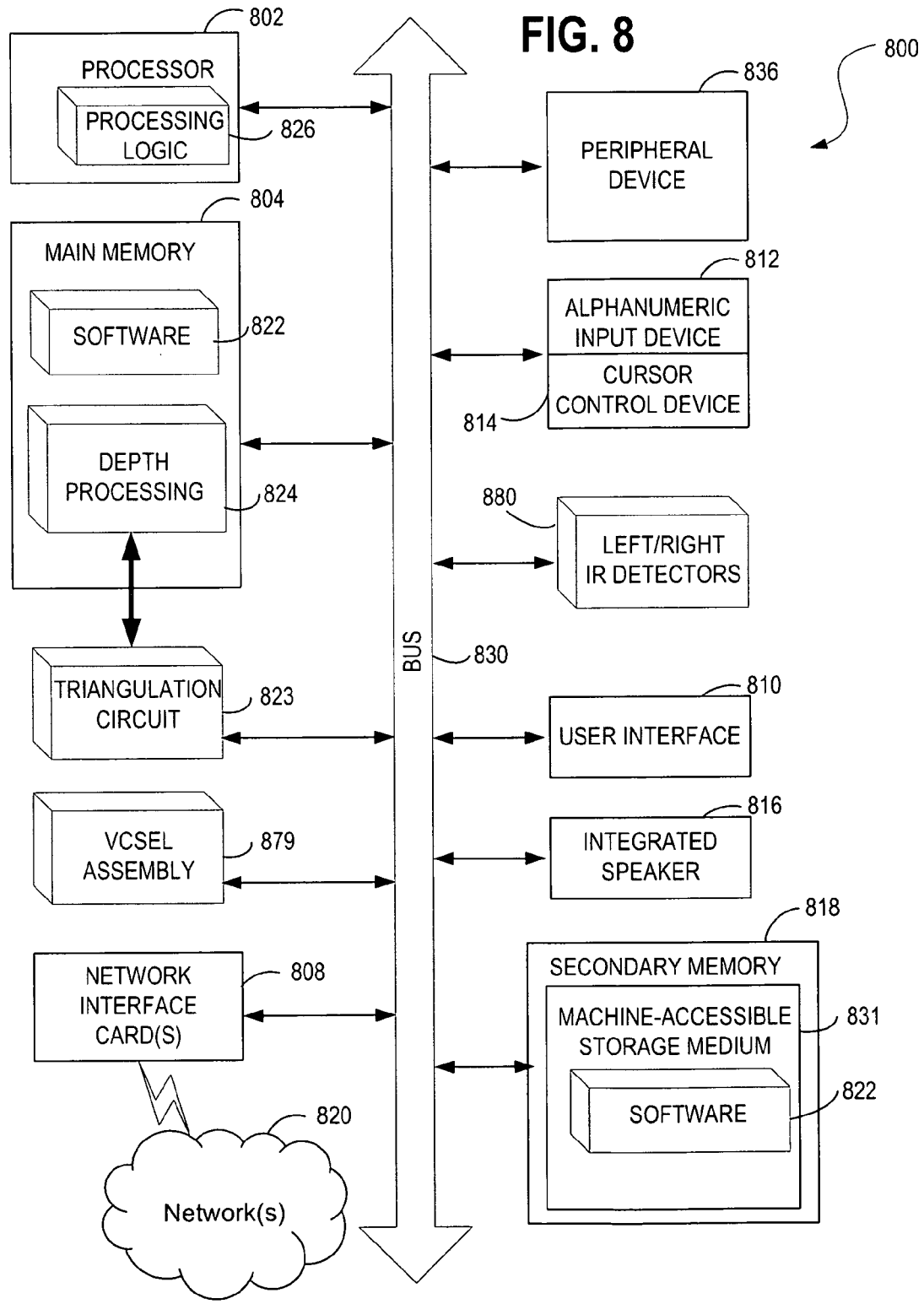
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein including implementing maximum likelihood image binarization in a coded light range camera.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes software 822 and an depth processing 824 functionality which is interfaced with the triangulation circuit 823 capable of performing triangulation processing including correspondence calculation amongst a set of multiple images captured by the left/right IR detectors 880 having projected represented therein a projected pattern emitted by the VCSEL assembly 879. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein including interfacing to the depth camera and/or performing processing on behalf of such a depth camera.

The computer system 800 may further include a network interface card 808. The computer system 800 also may include a user interface 810 (such as a video display unit, a liquid crystal display (LCD), touch screen, or a cathode ray tube (CRT)), an alphanumeric input device 812 (e.g., a keyboard), a cursor control device 814 (e.g., a mouse), and a signal generation device such as an integrated speaker 816. The computer system 800 may further include peripheral device 836 (e.g., wireless or wired communication devices, memory devices, storage devices, audio processing devices, video processing devices, etc.).

The secondary memory 818 may include a non-transitory machine-accessible or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art.

Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A depth camera comprising:
a Vertical-Cavity Surface-Emitting Laser projector (VCSEL projector) to emit a plurality of infrared beams;
a moveable lens to control the focus of the plurality of infrared beams emitted from the VCSEL projector, wherein the plurality of infrared beams are projected through the moveable lens to form a projected pattern projected onto a scene;
stereoscopic image capture devices to capture stereoscopic imagery from the scene having the projected pattern projected thereupon; and
a processing circuitry to determine depth to an object in the scene based on the captured stereoscopic imagery from the scene having the projected pattern represented therein as projected from the VCSEL projector, wherein the projected pattern dynamically changes from a first projected pattern on the scene to a second projected pattern on the scene to determine the depth to the object.

2. The depth camera of claim 1, wherein the plurality of infrared beams emitted by the VCSEL projector comprises light from the VCSEL projector imaging the VCSEL projector's surface pattern onto the scene through the moveable lens.

3. The depth camera of claim 1: wherein VCSEL projector's surface pattern is lithographically determined according to X,Y coordinates specified at a time of manufacture for the VCSEL projector; and wherein the VCSEL projector images the VCSEL projector's surface pattern onto the scene through the moveable lens, the projected surface pattern corresponding to the X,Y coordinates specified.

4. The depth camera of claim 1, wherein the moveable lens to control the focus of the plurality of infrared beams emitted from the VCSEL projector comprises a controllable lens movable laterally in an X and Y direction of a horizontal plane parallel with the VCSEL projector and moveable back and forth in a Z direction of a vertical plane perpendicular to the VCSEL projector.

5. The depth camera of claim 1, wherein the moveable lens to control the focus of the plurality of infrared beams emitted from the VCSEL projector comprises one of a membrane lens or an adaptive fluidic silicone-membrane lens to control the focus of the plurality of infrared beams emitted from the VCSEL projector or a Voice Coil Motor (VCM) type lens to control the focus of the plurality of infrared beams emitted from the VCSEL projector.

6. The depth camera of claim 1, wherein the stereoscopic image capture devices to capture stereoscopic imagery from the scene having the projected pattern projected thereupon comprises a left infrared camera to capture a left image of the scene having the projected pattern represented therein and a right infrared camera to capture a right image of the scene having the projected pattern represented therein.

7. The depth camera of claim 6, wherein the processing circuitry to determine the depth to the object in the scene based on the captured stereoscopic imagery from the scene having the projected pattern represented therein comprises the processing circuitry to determine the depth to the object in the scene by determining correspondence for each of a plurality of points in the captured left and right images and triangulating a distance to each of the plurality of points in the captured left and right images using disparity.

8. The depth camera of claim 1: wherein the depth camera is to perform assisted or active stereoscopic depth determination via an optical projection emanating from the VCSEL projector to illuminate the scene with a textured pattern; wherein the assisted or active stereoscopic depth determination provides an observable texture in the infrared light range by which the stereoscopic image capture devices of the depth camera capture stereoscopic imagery with the observable texture to improve correspondence determination by the processing circuitry for a scene which lacks sufficient natural texture by which to accurately determine correspondence.

9. The depth camera of claim 1, wherein the VCSEL projector comprises a micro-lens array to beam steer the plurality of infrared beams emitted by a VCSEL array of the VCSEL projector toward a center of the moveable lens before the plurality of infrared beams are projected through the moveable lens to form the projected pattern on the scene.

10. The depth camera of claim 1, wherein the moveable lens dynamically alters the projected pattern projected onto the scene by varying focus of the movable lens to increase or decrease diffraction of the projected pattern.

11. The depth camera of claim 1, wherein the plurality of infrared beams are projected through the moveable lens in full focus by the movable lens to form a high contrast representation of the projected pattern projected onto the scene or alternatively are projected through the moveable lens fully defocused by the movable lens to form a low contrast and fully diffused representation of the projected pattern projected onto the scene.

12. The depth camera of claim 1, wherein the plurality of infrared beams are projected through the moveable lens and are fully defocused by the movable lens to provide uniform illumination of the scene for a facial recognition depth determination algorithm.

13. The depth camera of claim 1, wherein movable lens changes a focus of the projected pattern projected onto the scene based on a quantity of ambient light present in the scene.

14. The depth camera of claim 1, wherein movable lens changes a focus of the projected pattern projected onto the scene according to a selected depth determination algorithm, wherein the selected depth determination algorithm is optimized for objects nearer to the depth camera or alternatively optimized for objects farther from the depth camera.

15. The depth camera of claim 1: wherein the depth camera is embodied within a drone or self-navigating robot; wherein processing circuitry is to iteratively cycle between a near field depth determination algorithm and a far field depth determination algorithm; and wherein the processing circuitry instructs the moveable lens to iteratively change the focus of the projected pattern projected onto the scene through the movable lens according to a degree of focus optimized for each of the near field depth determination and far field depth determination algorithms respectively.

16. The depth camera of claim 1, wherein the processing circuitry is to adjust for ambient illumination and reflection properties of the scene by increasing or decreasing a contrast of the projected pattern projected upon the scene by increasing or decreasing focus of the projected pattern projected upon the scene via the movable lens.

17. The depth camera of claim 1: wherein the processing circuitry is to reduce speckle in the scene by simulating movement in the scene as captured by the stereoscopic image capture devices by iteratively focusing and defocusing the projected pattern projected upon the scene via the movable lens.

18. The depth camera of claim 1: wherein the movable lens is to reduce speckle in the scene by inducing lateral movement of the movable lens causing iterative shifting of the projected pattern projected upon the scene as captured by the stereoscopic image capture devices.

19. The depth camera of claim 1: wherein the movable lens is to reduce speckle in the scene by beam steering the plurality of infrared beams emitted from the VCSEL projector through the moveable lens to induce movement of the projected pattern projected onto the scene as captured by the stereoscopic image capture devices.

20. The depth camera of claim 1, further comprising an RGB (Red, Green, Blue) camera to capture imagery of the scene in a visible light range.

21. The depth camera of claim 1, wherein the depth camera is embodied within one of: a gesture control module for a computer; a 3D photography module of a 3D camera; a 3D immersive gaming module of a gaming platform; a face recognition module to perform face recognition based security in-lieu of alphanumerical passwords; a drone navigation control module; a robot navigation control module; a smart phone; and a tablet.

22. A method in a depth camera, wherein the method comprises:
emitting a plurality of infrared beams via a Vertical-Cavity Surface-Emitting Laser projector (VCSEL projector);
steering the plurality of infrared beams through a moveable lens of the depth camera, wherein the movable lens controls the focus of the plurality of infrared beams emitted from the VCSEL projector;
projecting the plurality of infrared beams emitted from the VCSEL projected through the moveable lens to form a projected pattern projected onto a scene;
capturing stereoscopic imagery from the scene having the projected pattern projected thereupon via stereoscopic image capture devices of the depth camera; and
determining depth to an object in the scene based on the captured stereoscopic imagery from the scene having the projected pattern represented therein, wherein the projected pattern dynamically changes from a first projected pattern on the scene to a second projected pattern on the scene to determine the depth to the object in the scene.

23. The method of claim 22, further comprising:
dynamically altering the projected pattern projected onto the scene by varying focus of the movable lens to increase or decrease diffraction of the projected pattern; and
reducing speckle in the scene by inducing movement of the projected pattern projected onto the scene as captured by the stereoscopic image capture devices by iteratively focusing and defocusing the projected pattern projected upon the scene via the movable lens or by inducing lateral movement of the movable lens causing iterative shifting of the projected pattern projected upon the scene as captured by the stereoscopic image capture devices or by beam steering the plurality of infrared beams emitted from the VCSEL projector through the moveable lens to induce movement of the projected pattern projected onto the scene as captured by the stereoscopic image capture devices.

24. A camera body assembly, comprising:
a camera body;
a battery;
a display;
a processor and a memory to perform logic or instructions;
a lens mount assembly, the lens mount assembly, including one or more optical components and Complementary metal-oxide-semiconductor (CMOS) components; and
a depth camera assembly Printed Circuit Board (PCB) having affixed thereto:
a Vertical-Cavity Surface-Emitting Laser projector (VCSEL projector) to emit a plurality of infrared beams;
a moveable lens to control the focus of the plurality of infrared beams emitted from the VCSEL projector, wherein the plurality of infrared beams are projected through the moveable lens to form a projected pattern projected onto a scene;
stereoscopic image capture devices to capture stereoscopic imagery from the scene having the projected pattern projected thereupon; and
a processing circuitry to determine depth to an object in the scene based on the captured stereoscopic imagery from the scene having the projected pattern represented therein as projected from the VCSEL projector, wherein the projected pattern dynamically changes from a first projected pattern on the scene to a second projected pattern on the scene to determine the depth to the object in the scene.

25. The camera body assembly of claim 24: wherein the camera body comprises one of: a gesture control system, a 3D photography system, a 3D immersive gaming system, a face recognition system to perform face recognition based security in-lieu of alphanumerical passwords, a drone or robot control system, a depth sensing camera system to perform any of stereoscopic imaging depth sensing, a hand-held stand-alone camera, a tablet computing device, and a hand-held smartphone; and wherein the depth camera assembly PCB is integrated into the camera body by an Original Equipment Manufacturer (OEM) for the gesture control system, the 3D photography system, the 3D immersive gaming system, the face recognition system, the drone or robot control system, the depth sensing camera system, the hand-held stand-alone camera, the tablet computing device, or the hand-held smartphone.

* * * * *